United States Patent [19]

Woody

[11] 3,824,950
[45] July 23, 1974

[54] CONFECTION DECORATING MACHINE AND DRIVE TRANSFER

[76] Inventor: George D. Woody, 615 S. Pine St., York, Pa. 17405

[22] Filed: Mar. 20, 1972

[21] Appl. No.: 236,327

[52] U.S. Cl. .................................. 118/14, 112/323
[51] Int. Cl. ....... B05c 5/00, B05c 11/14, A23g 3/25
[58] Field of Search .................. 118/14, 24, 27–29, 118/323

[56] References Cited
UNITED STATES PATENTS

| | | | |
|---|---|---|---|
| 2,880,695 | 4/1959 | Timmons | 118/14 |
| 3,185,129 | 5/1965 | Sollich | 118/24 X |
| 3,450,095 | 6/1969 | Greiner | 118/14 |

*Primary Examiner*—Louis K. Rimrodt
*Attorney, Agent, or Firm*—Newton, Hopkins & Ormsby

[57] ABSTRACT

A decorator for imparting designs on the surfaces of candies, confections and cookies, including a continuously moving conveyor for carrying the item to be decorated and a dispensing tube having plural discharge openings which is supported above and extends across the conveyor. The dispensing tube is suspended by cables and is connected to a support bar through bell crank and links. A drive mechanism incorporates two eccentric drives, one connected to oscillate or reciprocate the dispensing tube back and forth in a direction across the path of the conveyor and the other being connected to the bell crank to oscillate or reciprocate the dispensing tube back and forth in the direction of conveyor travel. The drive features a change speed arrangement so that the relative rotational speeds of the two eccentrics may be altered. In one speed relation, the eccentrics are driven in unison and in the other speed relation, the dispensing tube is driven at twice the speed back and forth in the direction of conveyor travel than it is in the transverse direction.

13 Claims, 9 Drawing Figures

CONFECTION DECORATING MACHINE AND DRIVE TRANSFER

BACKGROUND OF THE INVENTION

This application represents an improvement in my prior U.S. Pat. No. 3,427,650 of Feb. 11, 1969. In my prior patent, an arrangement is shown for decorating candies or the like, in which an article or articles being conveyed along one path by a moving belt are subjected to the application of a semi-liquid or plastic strip, ribbon or filament of decorating material such as tempered chocolate. The ribbon-or-rope dispensing head may be reciprocated in either or both of two directions, one transversely of the conveying path and the other longitudinally thereof. The stroke of reciprocation may be varied in each case, as may be the speed of the reciprocations relative to the conveyor speed. Finally, the phase relationships of the two movements may be varied.

Although a great many variations of patterns may be achieved by the theoretically infinite combinations and permutations of adjustments possible with my prior machine, there is nevertheless a definite limitation as to the basic effects which may be produced.

BRIEF SUMMARY OF THE INVENTION

The present invention is directed to an arrangement wherein the drive mechanism for the dispensing head is modified to achieve a greater degree of latitude in the basic design effects which may be achieved by the machine. Basically, the drive modification concerns the provision of means for altering the stroke speeds relative to each other such that the dispensing head may be driven at the same or at a faster speed back and forth in the direction of conveyor travel than it is in the transverse direction. When the motions are at the same speed in both directions, a single loop design and variations thereof are possible whereas when the motion back and forth along the direction of conveyor travel is faster than the transverse motion, a double loop design and variations thereof are possible.

BRIEF DESCRIPTION OF THE DRAWING FIGURES

DETAILED DESCRIPTION OF THE INVENTION

Figure 1:
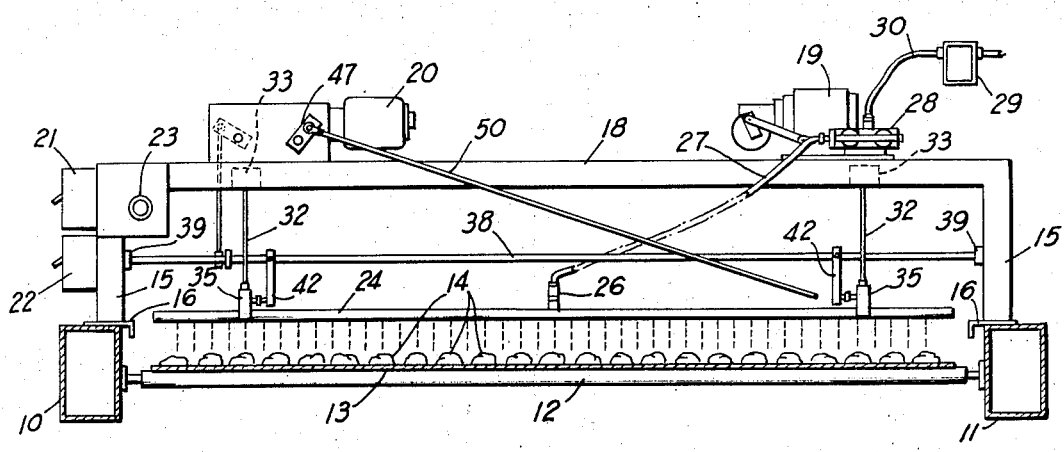
FIG. 1 is a vertical sectional view of one form of the present invention as applied to conventional confection conveyors.

Referring now to the specific structural details of the drawings, and in particular to FIG. 1, the machine will be seen to be substantially identical in many respects to the machine disclosed in my prior U.S. Pat. No. 3,427,650, including the longitudinal base rails 10 and 11 between which are supported a plurality of parallel transverse rolls 12 over which the upper flight of a continuous supporting belt or foraminous screen 13 travels. A group of articles to be decorated, such as the confections as indicated by the numerals 14 are continuously conveyed by the belt or screen 13 while being supported on the surface thereof.

The arrangement includes a frame comprising a pair of vertical uprights 15 having base support plates 16 which freely rest on the upper surfaces of the rails 10 and 11 and the frame is completed by a transverse beam 18 which extends between the upper ends of the uprights 15. By providing a frame of this structure the decorator device may be positioned anywhere along the longitudinal axis of the conveyor mechanism.

A dispensing head 24 is suspended in close proximity to, but vertically spaced above the conveyor 13 by means of flexible cables 32, or the like, which are secured at their upper ends to the transverse beam 18 by means of suspension blocks 33 and at their lower ends to clamping blocks 35 which in turn hold the dispensing head 24. The dispensing head 24 comprises a tube closed at both ends and having a plurality of spaced apart, in-line nozzles or orifices along its lowermost peripheral surface.

Figure 2:
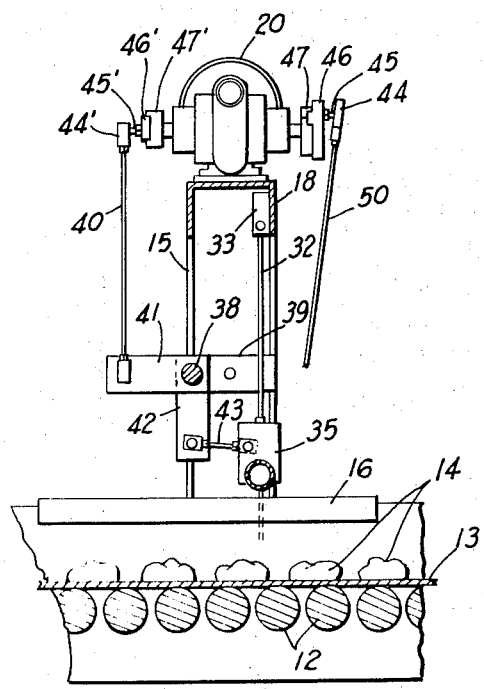
FIG. 2 is a fragmentary sectional view illustrating certain arrangements of the drive for effecting reciprocation of the dispensing head back and forth along the direction of conveyor travel.

A conventional fluid coupling 26 is mounted on the tube so that fluid decorating material may be supplied to the interior of the tube and thereafter be dispensed through the plurality of the orifices onto the moving article supported by the conveyor below. In FIG. 1, and in FIGS. 2 and 3 as well, the filaments, ribbons or ropes of decorating materials in fluid, semi-fluid or plastic form are represented by the vertical dashed lines.

The decorating material is supplied to the coupling 26 from a suitable source (not shown) by a pump 29. Between the pump and the coupling 26, the fluid decorating material passes through the hose 30 and strainer 28 and then through the hose 27 which is connected to the coupling 26. The strainer 28 preferably is of the self-cleaning type and is operated by a motor 19 mounted on the top of the frame. An on-off switch 22, mounted on the side of the frame, is used to control the motor 19 and, as well, a suitable reostat control (not shown) may be employed to control speed of the motor 29 so as to selectively carry the rate of flow of decorating material issuing as the ribbons from the dispensing head 24.

The decorating material is caused to be deposited in a variety of patterns upon the continuously moving articles on the conveyor 13 by providing the dispensing member 24 with the capability of various movements or combinations thereof. The suspension system of the dispensing head is such that this movement is permitted.

Figure 3:
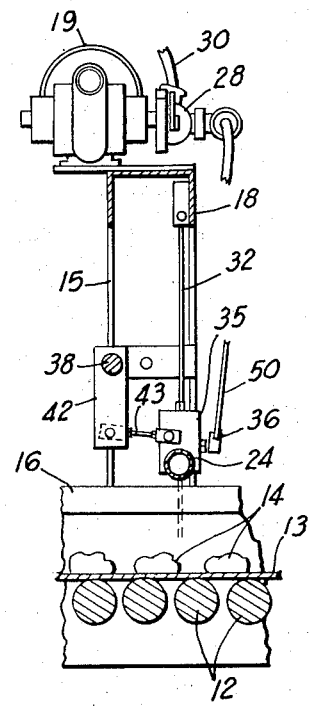
FIG. 3 is a fragmentary vertical section showing certain aspects of the mechanism for reciprocating the dispensing head back and forth transversely to the direction of conveyor travel.

A single driving motor 20 is employed to impart all movements to the dispensing head. This motor may be controlled by an off-on switch 21 as well as a reostat 23 to vary its speed. The motor 20 is capable of imparting a reciprocating motion to the dispensing head in a direction transverse to the movement of the conveyor 13 by means of a connecting link 50 which extends diagonally from the eccentric crank 47 to one of the clamping blocks 35, see particularly FIG. 3. The link is connected to the clamping block by means of a pin or pintle 36 as shown in FIG. 3.

Figure 6:
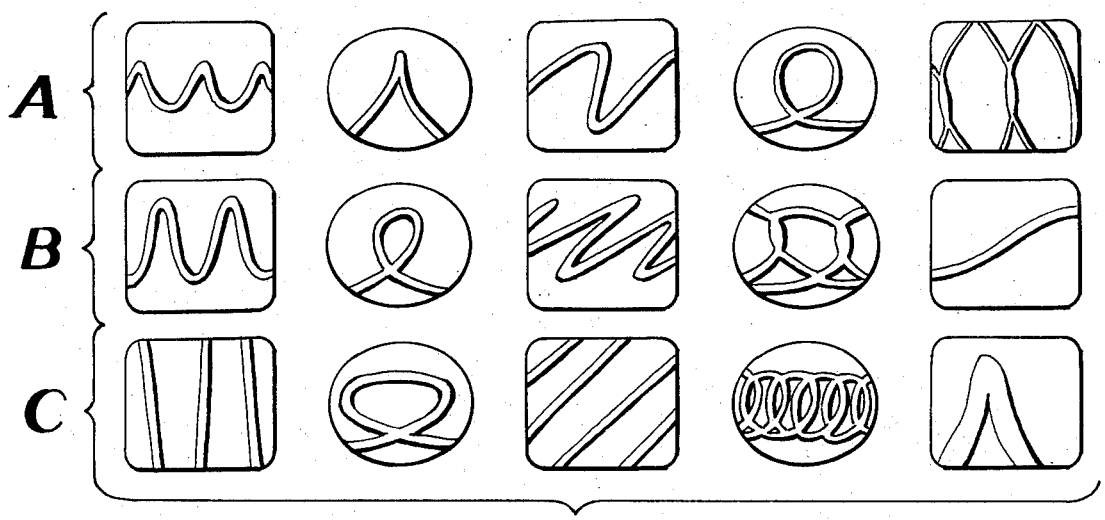
FIGS. 6A, 6B and 6C are plan views showing various designs which may be produced on confections or candies.

The eccentric crank 47 is illustrated in simplified form in the drawings herein but will be understood to be of the construction illustrated in FIG. 6 of my aforementioned U.S. Pat. No. 3,427,650 so as to allow variation of the eccentricity which determines the stroke of the transverse reciprocatory motion of the dispensing head 24. As disclosed in my prior patent, the eccentric cranks comprise a crank block 47 or 47', each of which has a recess in which a crank plate 46 or 46' is slidably mounted. The crank plate 46 has a pintle 45 or 45' mounted at one end and a longitudinally extending slot in the remaining portion of the plate so that the plate is adjustably mounted in the recess of the crank block 47 or 47' by means of a bolt extending through the slot an threaded into the block. The upper end of the link 20 carries a connector 44 which mounts on the pintle 45 of the crank plate 46 and the upper end of the link 40 carried a connector 44' which mounts on the pintle 45' of the crank plate 46'.

The means for providing the reciprocatory motion of the dispensing head 24 back and forth in the direction of the path of movement of the conveyor 13 includes a support rod 38 rotatably mounted on the uprights 15 of the frame by bearing members 39. A horizontal arm 41 of the bell crank arrangement is secured at one end of the control rod 38 in a manner that movement of the crank arm 41 causes the control rod to rotate in its bearings. At the other end of the crank arm 41 is secured a vertical link 40 by means of a pin or pintle. Additionally, vertical crank arms 42 are mounted on the control rod 38 for rotation therewith and are connected at the lower ends to clamping blocks 35 by means of freely pivotal pins or links 43.

From the above, it should be apparent that the machine as thus far described is in general, as is disclosed in my prior U.S. Pat. No. 3,427,650. According to the present invention, however, the drive connection between the motor 20 and the two eccentrics or crank arms respectively connected to the links 40 and 50 is specifically different from that disclosed and described in my aforesaid patent and is such as to provide an improved decorating effect.

Figure 4:
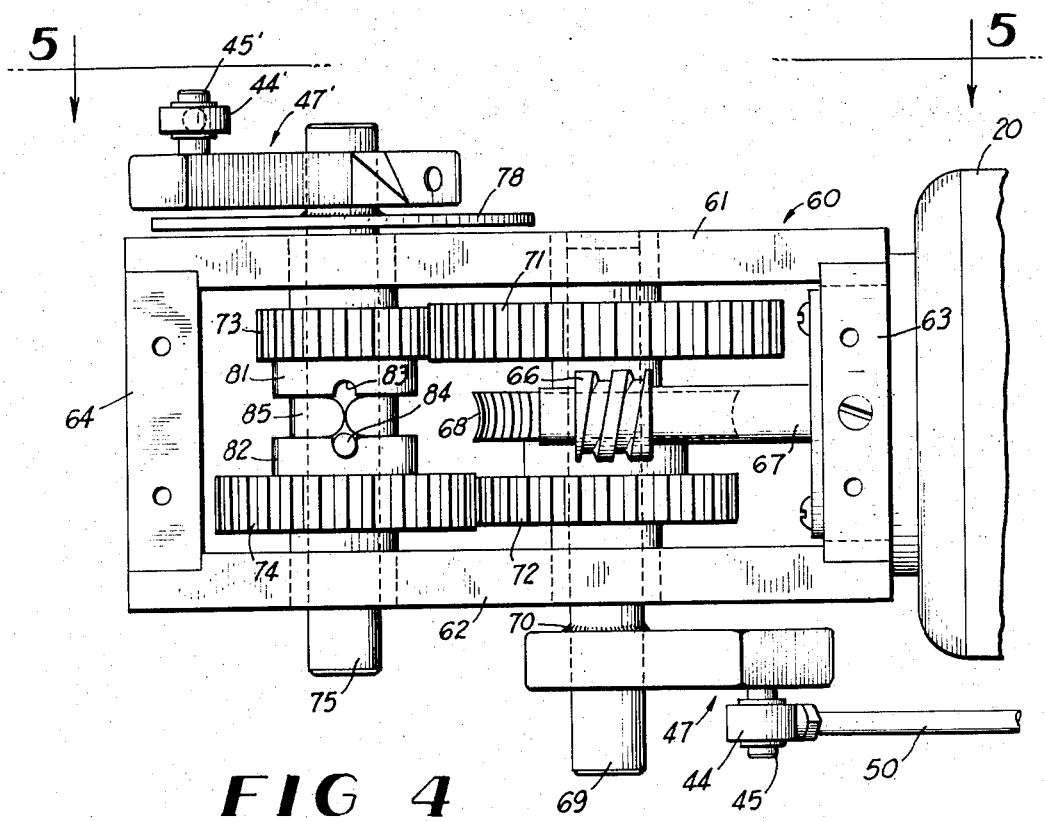
FIG. 4 is a top plan view, with cover removed, of the drive mechanism.
Figure 5:
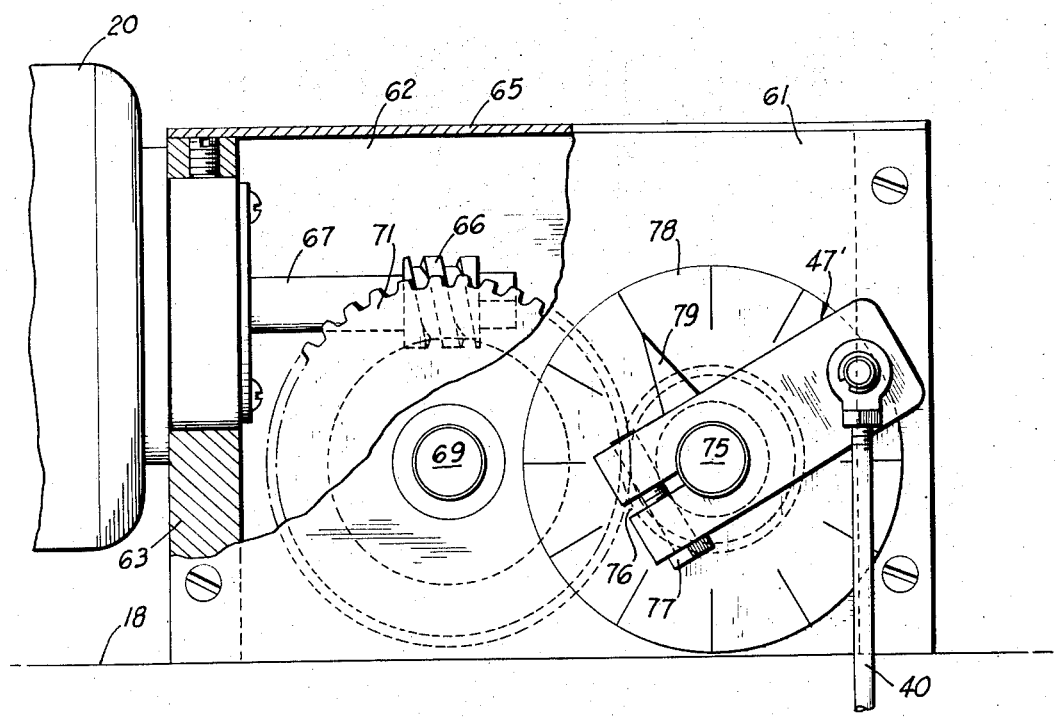
FIG. 5 is a side elevational view, portions being broken away, illustrating further details of the drive mechanism.

Referring now to FIGS. 4 and 5 wherein the improved drive mechanism according to the present invention is illustrated, it will be noted that the drive arrangement includes a frame indicated generally by reference character 60 and which may include opposite side plates 61 and 62 joined at their opposite ends by the end plate members 63 and 64 and the whole of which is rigidly affixed and mounted upon the transverse beam 18 of the dispensing attachment. A cover 65 is removably supported to enclose and house the gear elements, the cover being shown removed in FIG. 4.

The motor 20 is provided with a worm 66 on its output shaft 67 and which worm 66 is enmeshed with a worm wheel 68 keyed to the shaft 69 which is the shaft driving the eccentric for the link 50 to effect the reciprocatory motion of the dispensing head 24 back and forth transversely of the conveyor 13.

The crank assembly which connects the shaft 69 to the link 50 and which is illustrated for simplicity in FIG. 4 simply as a single element crank designated generally by the reference character 47 is rigidly fixed to the shaft 69 as by welding 70 and thus is in fixed position with respect thereto.

Between the side plates 61 and 62 and fixed to the shaft 69 there are a pair of gears 71 and 72 in constant mesh with the respective gears 73 and 74 which are rotatably mounted on the shaft 75. The shaft 75 carries the eccentric for driving the rod 40 to effect reciprocatory motion of the dispensing head 24 back and forth in the direction of movement of the conveyor 13 and, in FIGS. 4 and 5, the eccentric crank 47' is illustrated for the sake of simplicity as a single link designated generally by the reference character 47'. It will be understood, however, that both the crank 47 and the crank 47' shown in FIGS. 4 and 5 are to be constructed in accordance with the disclosure of FIG. 6 of my aforesaid prior patent and along the lines generally described for these crank arms as specified in FIG. 2 above.

It will be noted, however, that the crank assembly 47' is split as indicated by the reference character 76 and is provided with a clamping bolt 77 by means of which the angular position of the crank assembly 47' may be adjusted with respect to the shaft 75. Outboard of the side plate 61, the shaft 75 has an indicating plate 78 welded thereto and the assembly 47' is provided with a pointer 79 so that the relative position of the crank assembly 47' relative to the shaft 75 may be related to a specific index. For example, the markings or indicia on the plate 78 may be provided with an "0" mark indicating the position of the crank 47' being in phase with the position of the crank 47 on the shaft 69.

As mentioned before, the two gears 73 and 74 are rotatably mounted on the shaft 75 and in order to selectively couple either one of these gears to the shaft 75 to drive the same, the shaft 75 is provided with one radially projecting pin 84 and each of the gear collar portions 81 and 82 are provided with a semi-circular recess such as that indicated by the reference character 83. Pin 84 may be shifted back and forth for selective engagement within the recess 83 of either one of the collars 81 or 82 whereby the shaft 75 is coupled to that corresponding gear. Pin 84 is moved into engagement with the selected gear recess 83 by axially shifting shaft 75 by hand within housing side plates 61, 62 and rotating shaft 75 until pin 84 is seated within the appropriate gear recess 83. Surrounding shaft 75 in the space between the two collars 81 and 82 is provided a C-shaped spring clip or clamping device 85 having axial edge portions adjacent the split in clip 85 which provide camming surfaces to permit axial shifting of shaft 75 and pin 84. The spring clip ends normally spring together somewhat behind the pin 84 to hold same properly in position. Thus, in order to shift the pin 84, it is merely necessary to force it against the ends of the spring clip 85 forcing the ends apart and allowing the pin to be shifted either from one gear to the other or to an intermediate position in which neither gear 73 or 74 is drivingly connected to the shaft 75.

It will be noted that the two gears 72 and 74 have equal numbers of teeth so that when the drive is from the motor shaft 67, to the shaft 69 and from the shaft 69 through the gear set 72–74 to the shaft 75, the two crank assemblies 47 and 47' will rotate in unison, although they may not be in phased relationship as described hereinbefore. On the other hand, when the pin 84 is shifted from the position shown in FIG. 4 so that it engages within the notch of the gear 73, the drive is from the shaft 67 and through the gear set 71–73 to the shaft 75. In this case, the speed of the shaft 75 is twice that of the shaft 69 due to the fact that there are twice as many teeth on the gear 71 as there are on the gear 73. In this way, regardless of the gear set which is being utilized to connect the shaft 75 to the shaft 69, the phase relationship of the crank 47' with respect to that of the crank 47 will not be altered.

Figure 7:
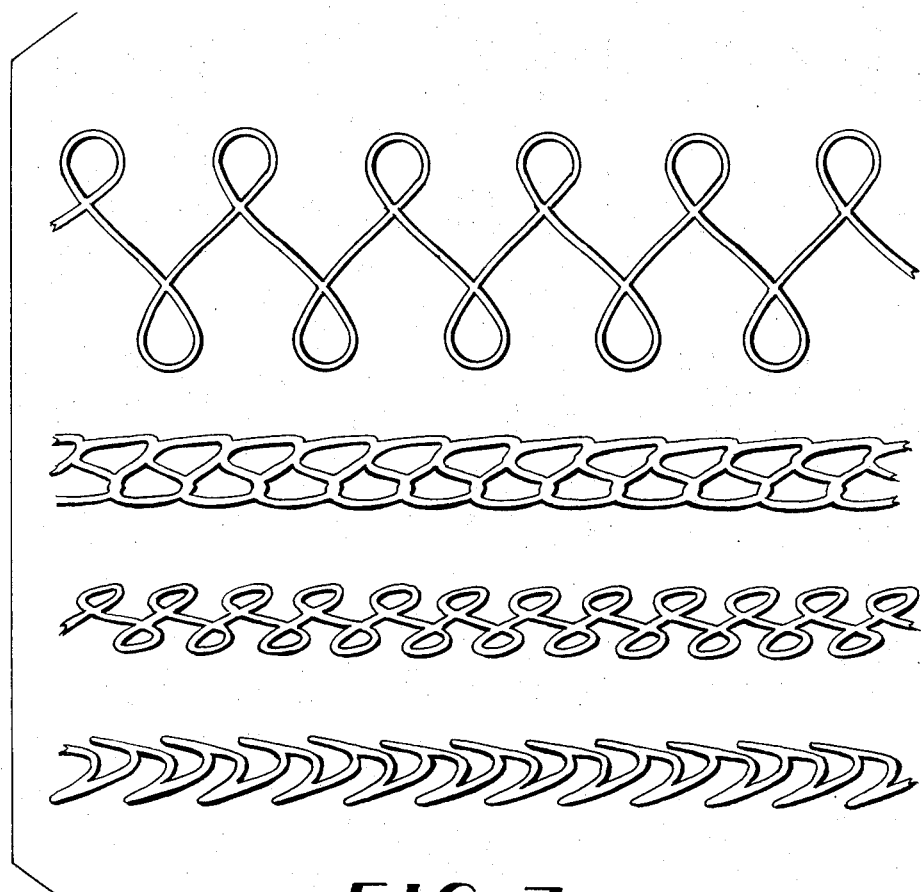
FIG. 7 is a view illustrating various designs according to the present invention.

At the same time, however, instead of being limited to the basic single loop design characteristics as depicted in FIGS. 6A, 6B and 6C which would prevail with a one-to-one drive ratio between the two cranks, a double loop design may be achieved as is shown in FIG. 7 by having the speed of reciprocation of the dispensing head 24 back and forth in the direction of movement of the conveyor 13 at twice the speed of the transverse reciprocatory motion.

What is claimed is:

1. A decorator for use in combination with an article carrying conveyor which travels to be decorated along a selected path, which comprises:
   a dispensing head and means for supplying decorating material to said dispensing head to issue downwardly in strand form therefrom;
   means for suspending said dispensing head above said conveyor and the articles carried thereby;
   first eccentric means for imparting back and forth movement of said dispensing head in a direction transverse to said path;
   second eccentric means for imparting back and forth movement of said dispensing head parallel to said path; and
   drive means for actuating said first and second eccentric means at at least two different relative speeds with respect to each other but in fixed phase relationship for each such different relative speed.

2. A decorator as defined in claim 1 wherein said drive means comprises a first shaft on which said first eccentric means is mounted, a second shaft on which said second eccentric means is mounted, and a pair of gear sets for selectively imparting a number of speed ratios between said first and second eccentric means.

3. A decorator as defined in claim 2 including a worm wheel fixed to said first shaft and a motor-driven worm in engagement therewith, one of said gear sets comprising a drive gear fixed to said first shaft on one side of said worm wheel and a driven gear in constant mesh with said drive gear, the other of said gear sets comprising a second drive gear fixed to said first shaft on the other side of said worm wheel and a second driven gear in constant mesh with said second drive gear, said driven gears being rotatably mounted on said second shaft, and means for selectively coupling either one of said driven gears to said second shaft.

4. In a decorator for use in combination with an article carrying conveyor which travels articles to be decorated along a selected path, said decorator comprising an elongated decorating material discharge pipe having a plurality of apertures therein and aligned in spaced relation to said conveyor transversely of said path, means for supplying decorating material to said discharge pipe to issue downwardly in strand form from the apertures therein, means for suspending said dispensing head above said conveyor as aforesaid, a first crank arm connected to said discharge pipe for reciprocating said pipe back and forth in a direction transverse to said path, a second crank arm connected to said discharge pipe for reciprocating said pipe back and forth in a direction parallel to said path, each crank arm being adjustable to vary the strokes of such back and forth movements and one of said crank arms being selectively adjustable with respect to the other to change the phase relationship between the crank arms, and a single motor driving both crank arms and having a control therefor to vary the rotational speeds of said crank arms with respect to the speed of conveyor travel, the improvement comprising:
   drive means connecting said motor to said crank arms for selectively rotating said second crank arm in unison with and at twice the speed of said first crank arm whereby movement of said pipe parallel to said path is either in unison with or at twice the frequency of movement thereof transverse to said path.

5. A decorator for use in combination with an article carrying conveyor which travels articles to be decorated along a selected path, which comprises:
   a dispensing head and means for supplying decorating material to said dispensing head to issue downwardly in strand form therefrom;
   means for suspending said dispensing head above said conveyor and the articles carried thereby; and
   compound drive means for imparting movement to said dispensing head simultaneously in a direction back and forth transverse to said path at a first selected frequency and in a direction back and forth parallel to said path at a second selected frequency in which the first and second frequencies may be different.

6. A decorator as defined in claim 5 wherein said compound drive means includes means for selectively changing the ratio of said first and second frequencies.

7. A decorator as defined in claim 6 wherein the means last mentioned is effective to change said ratio between 1/1 and 2/1.

8. A decorator as defined in claim 7 wherein said second selected frequency is changed between that which is equal to said first selected frequency and that which is twice said first selected frequency.

9. A decorator as defined in claim 6 wherein said second selected frequency is changed between that which is equal to said first selected frequency and that which is twice said first selected frequency.

10. A decorator as defined in claim 5 wherein said compound drive means includes means for selectively varying the relative phase between said first and second selected frequencies.

11. A decorator as defined in claim 10 wherein said compound drive means includes means for selectively changing the ratio of said first and second frequencies.

12. A decorator as defined in claim 11 wherein the means last mentioned is effective to change said ratio between 1/1 and 2/1.

13. A decorator as defined in claim 10 wherein said second selected frequency is changed between that which is equal to said first selected frequency and that which is twice said first selected frequency.

* * * * *